United States Patent Office 3,842,097
Patented Oct. 15, 1974

3,842,097
2-(PHENOXYALKYLTHIO)IMIDAZOLES AND CONGENERS
Robert C. Tweit, Wilmette, Ill., assignor to
G. D. Searle & Co., Chicago, Ill.
No Drawing. Filed Jan. 22, 1973, Ser. No. 325,223
Int. Cl. C07d 49/36
U.S. Cl. 260—309    15 Claims

ABSTRACT OF THE DISCLOSURE

Preparation and the selective antigonococcal activity of 2-(phenoxyalkylthio)imidazoles and congeners is disclosed.

This invention relates to 2-(phenoxyalkylthio)imidazoles and congeners and to processes for the preparation thereof. More particularly, this invention provides new, useful, and unobvious chemical compounds of the formula

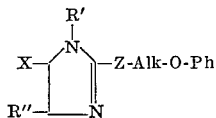

wherein R' and R" each represent hydrogen or lower alkyl, alike or different; X represents hydrogen or nitro; Z represents thio, sulfinyl, or sulfonyl; Alk represents lower alkylene; and Ph represents phenyl optionally substituted by hydrogen, lower alkyl, halogen, nitro, cyano, formyl, and/or carboxyl.

The lower alkyls comprehended by R', R", and (as phenyl substituents) Ph are methyl, ethyl, propyl, isopropyl, butyl, isobutyl, sec-butyl, tert-butyl, pentyl, neopentyl, hexyl, isohexyl, heptyl, and like monovalent, saturated, acyclic, straight- or branched-chain, hydrocarbon groupings of the formula

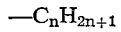

wherein $n$ represents a positive integer less than 8.

The lower alkylene represented by Alk are methylene, ethylene, trimethylene, propylene, tetramethylene, 1,1-dimethylethylene, pentamethylene, 2,2-dimethyltrimethylene, and like bivalent, saturated, acyclic, straight- or branched-chain, hydrocarbon groupings having the formula

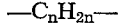

wherein $n$ is defined as before.

The halogen comprehended (as phenyl substituents) by Ph are fluorine, chlorine, bromine, and/or iodine, among which bromine is preferred.

The halogens comprehended (as phenyl substituents by Ph are fluorine, chlorine, bromine, and/or iodine, among which bromine is preferred.

Whereas there can be as many as 5 substituents, alike or different, on the phenyl nucleus comprehended by Ph, a single substituent is preferred. Positioning of the substituent(s) relative to the point of attachment of the nucleus to the oxygen atom and, where a plurality are present, to each other is not critical.

It follows from the foregoing disclosure that compounds within the scope of the invention include those having the formula set forth in the first paragraph following the abstract wherein (1) R' represents hydrogen or lower alkyl; R" represents hydrogen or methyl; X represents hydrogen or nitro; Ph represents phenyl optionally mono-substituted by bromo, nitro, cyano, formyl, or carboxyl; Z represents thio, sulfinyl, or sulfonyl; and Alk represents lower alkylene;

(2) R' represents hydrogen or lower alkyl; R" represents hydrogen or methyl; X represents hydrogen; Ph represents phenyl optionally mono-substituted by bromo, nitro, cyano, formyl, or carboxyl; Z represents thio, sulfinyl, or sulfonyl; and Alk represents lower alkylene;

(3) R' represents methyl, R" and X each represent hydrogen, Ph represents phenyl, Z represents thio, and Alk represents lower alkylene;

(4) R' and R" each represent hydrogen or methyl, with the proviso that when one represents hydrogen the other represents methyl; X represents hydrogen; Ph represents p-bromophenyl; Z represents thio; and Alk represents ethylene;

(5) R' represents methyl, R" and X each represent hydrogen, Ph represents nitrophenyl, Z represents thio, and Alk represents lower alkylene;

(6) R' represents lower alkyl, R" and X each represent hydrogen, Ph represents p-cyanophenyl, Z represents thio, and Alk represents ethylene;

(7) R' represents lower alkyl; R" represents hydrogen; X represents nitro; Ph represents phenyl mono-substituted by bromo, nitro, cyano, or carboxyl; Z represents thio, sulfinyl, or sulfonyl; and Alk represents lower alkylene;

(8) R' represents methyl, R" represents hydrogen X represents nitro, Ph represents nitrophenyl, Z represents thio, and Alk represents lower alkylene;

(9) R' represents methyl, R" represents hydrogen, X represents nitro, Ph represents p-cyanophenyl, Z represents thio or sulfinyl, and Alk represents ethylene;

(10) R' represents lower alkyl, R" represents hydrogen, X represents nitro, Ph represent carboxyphenyl, Z represents thio, and Alk represents lower alkylene.

The compounds to which this invention relates are useful by reason of their valuable biological properties—especially their relatively selective anti-gonococcal activity. They are also antibacterial in respect of *Erwinia* sp., antiprotozoal re *Trichomonas vaginalis* and *Tetrahymena pyriformis*, and antifungal re *Trichophyton mentagrophytes* and *Verticillium albo-atrum*.

The antigonococcal utility of the instant compounds is evident from the results of a standarized test for their bactericidal effect on *Neisseria gonorrhoeae*. The test is performed in a liquid medium supplemented with 0.1% agar. The medium is prepared by heating to the boiling point a mixture of:

|   | Gms. |
|---|---|
| Peptone (Difco Proteose Peptone No. 3) | 10 |
| Beef extract | 1 |
| Dextrose | 5 |
| Sodium chloride | 5 |
| Phenyl red | 0.018 |
| L-cysteine hydrochloride | 0.5 |
| Agar | 5 | and distilled water q.s. 1000 ml. The medium is dispensed in 9.6-ml. portions into 20 x 125 mm. screw-cap test tubes and sterilized by autoclaving for 15 minutes at 121° C. The tubes are then cooled to room temperature, whereupon 0.3 ml. of Dubos medium serum is added to each, followed first by an appropriate dilution of test compound in 0.1 ml. of methanol or acetone and finally by 2 drops of a 48-hour culture of *N. gonorrhoeae* such as A.T.C.C. 19424 or 23050. The tubes are then flushed for 20 seconds with 5% carbon dioxide in air, tightly capped, and thereupon incubated at 37° C. for 72 hours. Each dilution of test compound is run in duplicate. Growth of the organism produces acid, which causes the medium to change in color from red to yellow. Survival of the organism is checked by streaking on a nutrient medium [Difco GC Medium base supplemented with 1% of hemoglobin and 1% of a sterile yeast concentrate containing crystal violet (Difco supplement A.)]. Potency is expressed as the minimum concentration at which no gonococci survive. The products of Examples 15 and 18 hereinafter were found active at <0.5 and 0.1 γ/ml., respectively, versus *N. gonorrhoeae* A.T.C.C. 19424 in this test.

The utility of the instant compounds in respect of *Erwinia* sp., *Trichomonas vaginalis*, *Tetrahymena pyriformis*, *Trichophyton mentagrophytes*, and *Verticillium albo-atrum* can be demonstrated by the standardized tests described in U.S. 3,682,951. The products of Example 7 and 16 were found active at 1000 and 100 γ/ml., respectively, in these tests.

Those skilled in the art will recognize that observations of activity in standardized tests for particular biological effects are fundamental to the development of valuable new drugs, both veterinary and human.

The sulfides of this invention can be prepared by heating a mercaptan of the formula

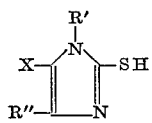

with a bromoalkyl ether of the formula

Br—Alk—O—Ph in a solvent such as methyl alcohol, isopropyl alcohol, or dioxane. The resultant sulfide is converted to the corresponding sulfoxide by contacting in chloroform at 5° C. with 1 equivalent of *m*-chloroperbenzoic acid; 2 or more equivalents of the peracid, particularly where contact time is prolonged, afford the sulfone.

An alternative method of preparing a 5-nitroimidazole of this invention is to heat the 5-desnitro analog with aqueous nitric acid. If a formyl substituent be present under these conditions, oxidation thereof to carboxy results. Still another method of preparing a carboxyphenoxy compound of this invention is to hydrolyze the corresponding cyanophenoxy compound with hot aqueous sulfuric acid.

Equivalent to the carboxy-substituted compounds of this invention are the alkali metal, alkaline-earth metal, and ammonium salts thereof preparable by contacting with 1 equivalent of lithium, sodium, potassium, barium, strontium, calcium, ammonium, or like hydroxide in an aqueous medium.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

1-methyl-2-[(2-phenoxyethyl)thio]imidazole

A mixture of 57 parts of 1-methylimidazole-2-thiol, 100 parts of β-bromophenetole, and 400 parts of methyl alcohol is heated at the boiling point under reflux for 6 hours, then stripped of solvent by vacuum distillation. The residue is mixed with 3 volumes of water, whereupon aqueous 5% sodium bicarbonate is added q.s. neutrality. The resultant mixture is extracted with ether. The ether extract is dried over anhydrous sodium sulfate. Solvent is removed by vacuum distillation, and the residue is taken up in benzene. The benzene solution is chromatographed on silica gel, using benzene and mixtures thereof with increasing amounts of ethyl acetate as developing solvents. From an eluate comprising 15% ethyl acetate in benzene, on evaporation of solvent, 1-methyl-2-[(2-phenoxyethyl) thio]imidazole is obtained as the residue. The product has the formula

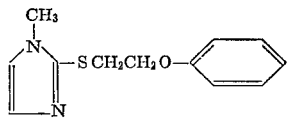

EXAMPLE 2

(A) 1-methyl-2-[(4-phenoxybutyl)thio]imidazole hydrobromide: A mixture of 57 parts of 1-methylimidazole-2-thiol, 115 parts of 4-bromobutyl phenyl ether, and 400 parts of isopropyl alcohol is heated and stirred at 90° overnight. On cooling, a solid forms. The product thus isolated is 1 - methyl-2-[(4-phenoxybutyl)thio]imidazole hydrobromide melting at approximately 114–115°.

(B) 1-methyl-2-[(4-phenoxybutyl)thio]imidazole: To a solution of 10 parts of 1-methyl-2-[(4-phenoxybutyl) thio]imidazole hydrobromide in 10 volumes of water is added sufficient aqueous 5% sodium carbonate to bring the pH to 7. The resultant mixture is extracted with ether. The ether extract is dried over anhydrous sodium sulfate and stripped of solvent by vacuum distillation. The residue is 1-methyl-2-[(4-phenoxybutyl)thio]imidazole.

EXAMPLE 3

1-methyl-2-[(4-phenoxybutyl)sulfonyl]imidazole

To a solution of 27 parts of 1-methyl-2-[4-(phenoxybutyl)thio]imidazole in 375 parts of chloroform at around 5° is added, portionwise with stirring, 51 parts of 67.5% *m*-chloroperbenzoic acid. The resultant mixture is allowed to stand at room temperatures for 3 days, then filtered. The filtrate is washed with aqueous 5% sodium carbonate, then dried over anhydrous sodium sulfate, and finally stripped of solvent by vacuum distillation. The residue is 1-methyl-2-[(4-phenoxybutyl)sulfonyl]imidazole which, crystallized from acetone, melts at 111.5–113.5°. The product has the formula

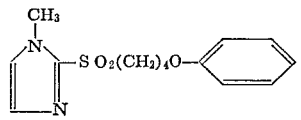

EXAMPLE 4

2-{[2-(*p*-bromophenoxy)ethyl]thio}-4-methylimidazole hydrobromide

A mixture of 23 parts of 4-methylimidazole-2-thiol, 56 parts of *p*,β-dibromophenetole, and 160 parts of isopropyl alcohol is heated at 90° overnight. After cooling, ether is introduced to the point of turbidity. The precipitate which forms is filtered off and dried in air. The product thus isolated is 2-{[2-(*p*-bromophenoxy)ethyl]thio}-4-methylimidazole hydrobromide melting at approximately 137–138°.

EXAMPLE 5

(A) 2-{[2-Δ*p*-bromophenoxy)ethyl]thio} - 1 - methylimidazole hydrobromide: A mixture of 57 parts of 1-methylimidazole-2-thiol, 140 parts of *p*,β-dibromophenetole, and 400 parts of isopropyl alcohol is heated at 90° overnight, whereupon solvent is removed by vacuum distillation and a small amount of acetone then introduced, followed by ether q.s. incipient precipitation. The precipitate which forms is 2-{[2-(*p*-bromophenoxy)ethyl] thio}-1-methylimidazole hydrobromide which, filtered off and dried in air, melts at 132–134°.

(B) 2-{[2-(*p*-bromophenoxy)ethyl]thio} - 1 - methylimidazole: A solution of approximately 14 parts of 2-{[2-(*p*-bromophenoxy)ethyl]thio} - 1 - methylimidazole hydrobromide in 10 volumes of water is neutralized with aqueous 5% sodium carbonate. The resultant mixture is extracted with ether. The ether extract is dried over anhydrous sodium sulfate and stripped of solvent by vacuum distillation. The solid residue, which melts at 75–78°, is 2-{[2-(p-bromophenoxy)ethyl]thio} - 1 - methylimidazole.

EXAMPLE 6

2-{[2-(p-bromophenoxy)ethyl]thio}-1-methyl-5-nitroimidazole

A mixture of 53 parts of 2-{[2-(p-bromophenoxy)ethyl]thio}-1-methylimidazole, 71 parts of nitric acid, and 125 parts of water is heated for 6 hours, then poured onto 1000 parts of ice. The resultant mixture is neutralized with aqueous 5% sodium carbonate. Upon extraction with dichloromethane, drying of the extract over anhydrous sodium sulfate, and stripping of solvent by vacuum distillation, crude 2-{[2-(p-bromophenoxy)ethyl]-thio}-1-methyl-5-nitroimidazole is obtained. The product is purified by chromatographing on silica gel and eluting with 2% ethyl alcohol in benzene. Evaporation of the solvent affords 2-{[2-(p-bromophenoxy)ethyl]thio}-1-methyl-5-nitroimidazole melting at approximately 104–105°.

EXAMPLE 7

2-{[2-(p-bromophenoxy)ethyl]sulfinyl}-1-methylimidazole

To a solution of 63 parts of 2-{[2-(p-bromophenoxy)ethyl]thio}-1-methylimidazole in 450 parts of chloroform maintained at around 5° is slowly added 51 parts of 67.5% m-chloroperbenzoic acid. The solid which forms is separated by filtration. The filtrate is washed with aqueous 5% sodium carbonate, dried over anhydrous sodium sulfate, and stripped of solvent by vacuum distillation. The residue, triturated with ether, affords 2-{[2-(p-bromophenoxy)ethyl]sulfinyl} - 1 - methylimidazole melting at 83–84.5°. The product has the formula

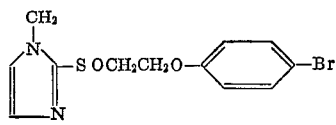

EXAMPLE 8

(A) 7-bromoheptyl o-nitrophenyl ether: A mixture of 275 parts of 1,7-dibromoheptane, 160 parts of o-nitrophenol, 42 parts of sodium hydroxide, and 750 parts of water is heated with stirring at the boiling point under reflux for 24 hours. After cooling, the organic phase is separated and diluted with 2 volumes of dichloromethane. The resultant solution is washed with aqueous 5% sodium carbonate, dried over anhydrous sodium sulfate, and stripped of solvent by vacuum distillation. The residue is 7-bromoheptyl o-nitrophenyl ether.

(B) 1 - methyl-2-{[7-(o - nitrophenoxy)heptyl]thio}-imidazole: A mixture of 228 parts of 1-methylimidazole-2-thiol, 630 parts of 7-bromoheptyl o-nitrophenyl ether, and 400 parts of isopropyl alcohol is heated at 90° for 18 hours. Solvent is thereupon removed by vacuum distillation. The residual oil, washed with aqueous 5% sodium carbonate and then filtered, is 1-methyl-2-{[1-(o-nitrophenoxy)heptyl]thio}imidazole, having the formula

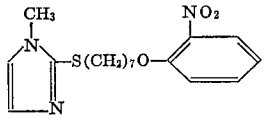

EXAMPLE 9

1-methyl-5-nitro-2-{[7-(o-nitrophenoxy)heptyl]thio}imidazole

A mixture of 74 parts of 1-methyl-2-{[7-(o-nitrophenoxy)heptyl]thio}imidazole, approximately 100 parts of nitric acid, and 50 parts of water is heated at 90° until evolution of brown fumes diminishes substantially, whereupon it is poured into 5 volumes of water. Aqueous 5% sodium carbonate q.s. neutrality is then introduced, and the mixture thus obtained is extracted with dichloromethane. The dichloromethane extract is diluted with an equal volume of benzene, the dichloromethane is distilled off, and the remaining solution is chromatographed on silica gel, using mixtures of benzene with increasing amounts of ethyl acetate as developing solvent. Eluates comprising 5% ethyl acetate in benzene initially contain 1,7-bis(o-nitrophenoxy)heptane. Subsequent eluates of this composition, upon removal of solvent by vacuum distillation and trituration of the residue with ether, afford 1-methyl-5-nitro-2-{[7-(o-nitrophenoxy)heptyl]thio}imidazole melting at 66–68°.

EXAMPLE 10

1-methyl-5-nitro-2-{[7-(o-nitrophenoxy)heptyl]sulfinyl}imidazole

To a solution of 20 parts of 1-methyl-5-nitro-2-{[7-(o-nitrophenoxy)heptyl]thio}imidazole in 750 parts of chloroform maintained with stirring at around 5° is added 13 parts of 67.5% m-chloroperbenzoic acid. When the addition is complete, the reaction mixture is allowed to stand overnight at room temperatures, then washed with aqueous 5% sodium carbonate, dried over anhydrous sodium sulfate, and finally stripped of solvent by vacuum distillation. The residue, an oil, is 1-methyl-5-nitro-2-{[7-(o-nitrophenoxy)heptyl]sulfinyl}imidazole.

EXAMPLE 11

1-methyl-5-nitro-2-{[7-(o-nitrophenoxy)heptyl]sulfonyl}imidazole

Doubling the amount of m-chloroperbenzoic acid called for in Example 10 affords 1-methyl-5-nitro-2-{[7-(o-nitrophenoxy)heptyl]sulfonyl}imidazole, which is further purified by chromatographing on silica gel, using benzene as the solvent. The initial eluate is a chlorinated material. Evaporation of solvent from subsequent eluates affords 1-methyl-5-nitro-2-{[7-(o-nitrophenoxy)heptyl]sulfonyl}imidazole as the residue.

EXAMPLE 12

(A) 1 - methyl - 2 - {[2-(p-nitrophenoxy)ethyl]thio}imidazole hydrobromide: A mixture of 57 parts of 1-methylimidazole-2-thiol, 123 parts of β-bromo-p-nitrophenetole, and 600 parts of dioxane is heated at 90° for 12 hours. Solvent is removed in process. The residue is 1-methyl-2-{[2-(p-nitrophenoxy)ethyl]thio}imidazole hydrobromide melting at 163–166°.

(B) 1 - methyl - 2 - {[2-(p-nitrophenoxy)ethyl]thio}imidazole: A solution of 35 parts of 1-methyl-2-{[2-(p-nitrophenoxy)ethyl]thio}imidazole hydrobromide in a minimum amount of hot water is neutralized with aqueous 5% sodium carbonate. The oil which separates, solidifies on cooling. The solid product, isolated by filtration and dried in air, is 1-methyl-2-{[2-(p-nitrophenoxy)ethyl]thio}imidazole.

EXAMPLE 13

1-methyl-5-nitro-2-{[2-(p-nitrophenoxy)ethyl]thio}imidazole

A solution of approximately 28 parts of 1-methyl-2-{[2-(p-nitrophenoxy)ethyl]thio}imidazole in 42 parts of nitric acid and 20 parts of water is heated at around 90° for 45 minutes and then poured onto 10 volumes of ice. Aqueous 5% sodium carbonate, q.s. neutrality is thereupon introduced. The resultant mixture is extracted with dichloromethane. The extracts are combined, concentrated to the point of incipient precipitation by distillation, treated with decolorizing charcoal, and filtered. From the filtrate, on cooling, 1-methyl-5-nitro-2-{[2-(p-nitrophenoxy)ethyl]thio}imidazole precipitates. Isolated by filtration and recrystallized from acetone, the product melts at approximately 137.5–138.5°.

EXAMPLE 14

(A) β-Bromo-p-cyanophenetole: A mixture of 250 parts of p-cyanophenol, 630 parts of 1,2-dibromoethane, 84 parts of sodium hydroxide, and 1250 parts of water is heated with stirring at the boiling point under reflux for 5½ hours, then cooled. The organic phase is thereupon separated, washed with aqueous 2% sodium hydroxide, dried over anhydrous sodium sulfate, and finally diluted with sufficient hexane to induce precipitation. The solid thrown down is filtered off and recrystallized from isopropyl alcohol to give β-bromo-p-cyanophenetole melting at 56–58°.

(B) 2-{[2-(p - cyanophenoxy)ethyl]thio} - 1 - methylimidazole hydrobromide: A mixture of 16 parts of 1-methylimidazole-2-thiol, 33 parts of β-bromo-p-cyanophenetole, and 120 parts of isopropyl alcohol is stirred and heated at 90° overnight. On cooling, precipitation occurs. The precipitate is filtered off and recrystallized from a mixture of methyl and isopropyl alcohols to give 2-{[2-(p - cyanophenoxy)ethyl]thio}-1-methylimidazole hydrobromide melting at 179.5–182°.

(C) 2-{[2-(p - cyanophenoxy)ethyl]thio} - 1 - methylimidazole: Approximately 34 parts of 2-{[2-(p-cyanophenoxy)ethyl]thio}-1-methylimidazole hydrobromide is dissolved in a minimum quantity of hot water. The resultant solution is neutralized with aqueous 5% sodium carbonate. The solid precipitate thrown down is 2-{[2-(p-cyanophenoxy)ethyl]thio}-1-methylimidazole which, filtered off and dried in air, melts at approximately 85–85.5°.

EXAMPLE 15

2-{[2-(p-cyanophenoxy)ethyl]thio}-1-methyl-5-nitroimidazole

A solution of 79 parts of 2-{[2-(p-cyanophenoxy)ethyl]thio}-1-methylimidazole in approximately 140 parts of nitric acid and 225 parts of water is heated at 90° for 1 hour, whereupon an addition 110 parts of nitric acid is introduced and heating at 90° is then resumed for 3 more hours. Excess acid is neutralized with aqueous 5% sodium carbonate, and the resultant mixture is extracted with dichloromethane. The extract is dried over anhydrous sodium sulfate and stripped of solvent by vacuum distillation. The residue is taken up in benzene and chromatographed on silica gel, using benzene and mixtures thereof with increasing amounts of ethyl alcohol as developing solvent. From an eluate comprising 5% ethyl alcohol in benzene, on evaporation of solvent and crystallization of the residue from a mixture of acetone and ether, 2-{[2-(p-cyanophenoxy)ethyl]thio}-1-methyl-5-nitroimidazole melting at 142.5–145° is obtained.

EXAMPLE 16

2-{[2-(p-cyanophenoxy)ethyl]sulfinyl}-1-methyl-5-nitroimidazole

To a solution of 22 parts of 2-{[2-(p-cyanophenoxy)ethyl]thio}-1-methyl - 5 - nitroimidazole in 375 parts of chloroform maintained at about 5° is slowly added, with stirring, 19 parts of 67.5% m-chloroperbenzoic acid. The reaction mixture is allowed to stand overnight at room temperatures, then filtered. The filtrate is chromatographed on silica gel, using chloroform as the developing solvent. Initial eluates containing impurities are discarded. 2-{[2-(p-cyanophenoxy)ethyl]sulfinyl}-1-methyl - 5 - nitroimidazole melting at 159.5–161° is obtained by evaporation of solvent from succeeding eluates and recrystallization of the residue from acetone.

EXAMPLE 17

2-{[2-(p-formylphenoxy)ethyl]thio}-1-methylimidazole

A mixture of 239 parts of 1-methylimidazole-2-thiol, 486 parts of 4-(2-bromoethoxy)benzaldehyde, and approximately 1300 parts of methyl alcohol is heated at the boiling point under reflux for 6 hours. Solvent is thereupon removed by vacuum distillation and the residue mixed with 3 volumes of water. This mixture is neutralized with aqueous 5% sodium bicarbonate, and the mixture thus obtained is extracted with ether. The ether extract is dried over anhydrous sodium sulfate and stripped of solvent by vacuum distillation. The residue is taken up in benzene and chromatographed on silica gel, using benzene and mixtures thereof with increasing amounts of ethyl acetate as developing solvent. From eluates comprising 15 and 20% ethyl acetate in benzene, on evaporation of solvent, 2-{[2-(p - formylphenoxy)ethyl]thio}-1-methylimidazole is obtained as the residue.

EXAMPLE 18

2 - {[2-(p-carboxyphenoxy)ethyl]thio}-1-methyl-5-nitroimidazole

A mixture of 8 parts of 2-{[2-(p-formylphenoxy)ethyl]thio}-1-methylimidazole, 78 parts of nitric acid, and 22 parts of water is heated for 2 hours and then poured into 5 volumes of water. A gum forms, which is separated and triturated with acetone. The resultant solid is filtered off and recrystallized from acetic acid to give 2-{[2-(p-carboxyphenoxy)ethyl]thio}-1 - methyl - 5 - nitroimidazole melting at approximately 212–213.5°.

EXAMPLE 19

(A) 2 - {[2-(p-cyanophenoxy)ethyl]thio}-1-hexylimidazole: A mixture of 37 parts of 1-hexylimidazole-2-thiol, 45 parts of β-bromo-p-cyanophenetole, and 200 parts of isopropyl alcohol is heated at 95° for 18 hours, whereupon solvent is removed by vacuum distillation and the residue taken up in 500 parts of water. The resultant solution is neutralized with aqueous 5% sodium carbonate. The biphasic mixture which eventuates is extracted with dichloromethane. The dichloromethane extract is dried over anhydrous sodium sulfate and stripped of solvent by vacuum distillation. The residue is taken up in benzene; and the benzene solution is chromatographed on silica gel, using benzene and mixtures thereof with increasing amounts of ethyl acetate as developing solvent. From an eluate comprising 2% ethyl acetate in benzene, on evaporation of solvent, 2-{[2-(p-cyanophenoxy)ethyl]thio}-1-hexylimidazole is obtained as the residue.

(B) 2 - {[2 - (p-carboxyphenoxy)ethyl]thio}-1-hexylimidazole: A solution of 46 parts of 2-{[2-(p-cyanophenoxy)ethyl]thio}-1-hexylimidazole in approximately 130 parts of 75% sulfuric acid is continuously stirred while being heated at 150° for 2 hours and then at 190° for an additional 2 hours. The resultant mixture is cooled and thereupon poured onto 10 volumes of ice. The mixture thus obtained is extracted with dichloromethane. The extract is dried over anhydrous sodium sulfate and then stripped of solvent by vacuum distillation, leaving 2-{[2-(p-carboxyphenoxy)ethyl]thio} - 1 - hexylimidazole as the residue. The product has the formula

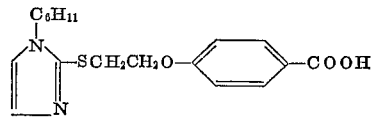

EXAMPLE 20

2 - {[2-(p-carboxyphenoxy)ethyl]thio} - 1 - hexyl-5-nitroimidazole

Substitution of 10 parts of 2-{[2-(p-carboxyphenoxy)ethyl]thio}-1-hexylimidazole for the 2-{[2-(p-formylphenoxy)ethyl]thio}-1-methylimidazole called for in Example 18 affords, by the procedure there detailed, 2-{[2-(p-carboxyphenoxy)ethyl]thio}-1-hexyl - 5 - nitroimidazole.

EXAMPLE 21

(A) 5-bromo - 3 - methylpentyl 3-formylphenyl ether and 1, 5-bis(m-formylphenoxy)-3-methylpentane: A mixture of 100 parts of 1, 5-dibromo-3-methylpentane, 24 parts of m-hydroxybenzaldehyde, 8 parts of sodium hydroxide, and 250 parts of water is stirred and heated at the boiling point under reflux in a nitrogen atmosphere for 24 hours, whereupon an additional 1000 parts of water is introduced and the resultant mixture steam distilled to remove excess dibromomethylpentane. The distilland is allowed to cool, then the organic material therein is separated, washed well with water, and dried in air. Fractional crystallization from isopropyl alcohol affords the less soluble by-product, 1, 5-bis(m-formylphenoxy)-3-methylpentane, as well as the desired 5-bromo-3-methylpentyl 3-formylphenyl ether.

(B) 2-{[5-(m - formylphenoxy)-3-methylpentyl]thio}-1-methylimidazole: Substitution of 605 parts of 5-bromo-3-methylpentyl 3-formylphenyl ether for the 4-(2-bromoethoxy)benzaldehyde called for in Example 17 affords, by the procedure there detailed, 2 - {[5-(m-formylphenoxy)-3-methylpenthyl]thio} - 1 - methylimidazole. The product has the formula

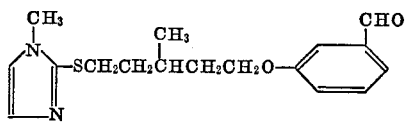

EXAMPLE 22

2-{[5-(m-carboxyphenoxy)-3-methylpentyl]thio}-1-methyl-5-nitroimidazole

Substitution of approximately 10 parts of 2-{[5-(m-formylphenoxy)-3-methylpentyl]thio} - 1 - methylimidazole for the 2 - {[2 - (p - formylphenoxy)ethyl]thio}-1-methylimidazole called for in Exampe 18 affords, by the procedure there detailed, 2 - {[5-(m-carboxyphenoxy)-3-methylpentyl]thio} - 1 - methyl - 5 - nitroimidazole.

EXAMPLE 23

Sodium salt of 2-{[2-(p-carboxyphenoxy)ethyl]thio}-1-methyl-5-nitroimidazole

To a mixture of 1 part of {[2-(p-carboxyphenoxy)ethyl]thio}-1-methyl-5-nitroimidazole with 5 parts of water is added just sufficient aqueous 10% sodium hydroxide to induce solution. Water is thereupon removed by vacuum distillation, and the residue is triturated with acetone. The resultant mixture is filtered. The solid product thus isolated is the sodium salt of 2-{[2-(p-carboxyphenoxy)ethyl]thio}-1-methyl - 5 - nitroimidazole, having the formula

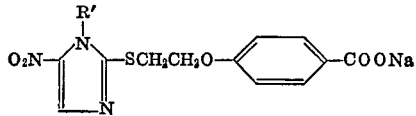

Equivalent to the foregoing compounds for the purposes of this invention are corresponding non-toxic acid addition salts of the formula

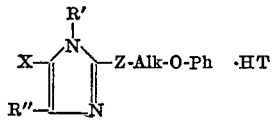

wherein R', R", X, Z, Alk and Ph having the meanings previously assigned and T represents one equivalent of an anion—for example, chloride, bromide, iodide, nitrate, phosphate, sulfate, sulfamate, methyl sulfate, ethyl sulfate, benzenesulfonate, toluenesulfonate, acetate, lactate, glycolate, succinate, malate, maleate, tartrate, citrate, gluconate, ascorbate, benzoate, cinnamate, or the like—which, in combination with the cationic portion of a salt aforesaid, is neither biologically nor otherwise undesirable. Preparation of these salts is accomplished by admixing corresponding bases with equivalent amounts of the various inorganic and strong organic acids defined by HT above.

What is claimed is:

1. A compound of the formula

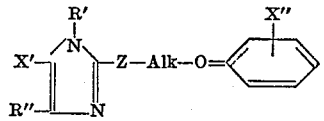

wherein R' represents hydrogen or lower alkyl; R" represents hydrogen or methyl; X' represents hydrogen or nitro; X" represents hydrogen, bromo, nitro, cyano, formyl or carboxyl; Z represents thio, sulfinyl, or sulfonyl; and Alk represents lower alkylene.

2. A compound according to Claim I having the formula

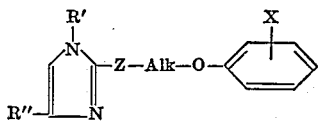

wherein R' represents hydrogen or lower alkyl; R" represents hydrogen or methyl; X represents hydrogen, bromo, nitro, cyano, formyl, or carboxyl; Z represents thio, sulfinyl, or sulfonyl; and Alk represents lower alkylene.

3. A compound according to Claim 1 having the formula

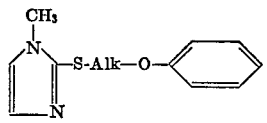

wherein Alk represents lower alkylene.

4. A compound according to Claim 1 which is 1-methyl-2-[(4-phenoxybutyl)thio]imidazole hydrobromide.

5. A compound according to Claim 1 having the formula

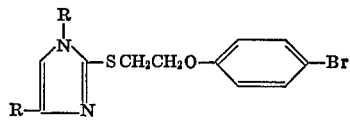

wherein R represents hydrogen in one occurence and methyl in the other.

6. A compound according to Claim 1 which is 2-{[2-(p-bromophenoxy)ethyl]thio}-1-methylimidazole.

7. A compound according to Claim 1 having the formula

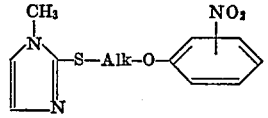

wherein Alk represents lower alkylene.

8. A compound according to Claim 1 having the formula

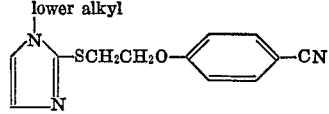

9. A compound according to Claim 1 having the formula

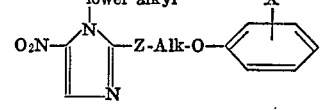

wherein Z represents thio, sulfinyl, or sulfonyl; Alk represents lower alkylene; and X represents bromo, nitro, cyano, or carboxyl.

10. A compound according to Claim 1 having the formula

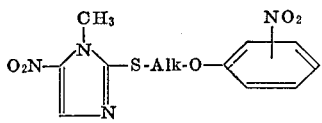

wherein Alk represents lower alkylene.

11. A compound according to Claim 1 which is 1-methyl-5-nitro - 2 - {[2 - (p-nitrophenoxy)ethyl]thio} imidiazole.

12. A compound according to Claim 1 having the formula

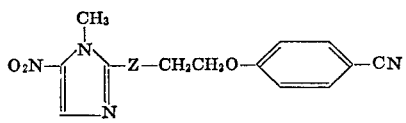

wherein Z represents thio or sulfinyl.

13. A compound according to Claim 1 which is 2-{[2 - (p-cyanophenoxy)ethyl]thio}-1-methyl - 5 - nitroimidazole.

14. A compound according to Claim 1 having the formula

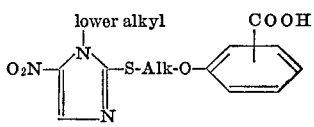

wherein Alk represents lower alkylene.

15. A compound according to Claim 1 which is 2-{[2-(p-carboxyphenoxy)ethyl]thio} - 1 - methyl - 5 - nitroimidazole.

References Cited

UNITED STATES PATENTS

| | | | |
|---|---|---|---|
| 2,654,761 | 10/1953 | Huebner et al. | 260—309 |
| 3,341,549 | 9/1967 | Henry | 260—309 |
| 3,499,001 | 3/1970 | Lutz | 260—309 |
| 3,714,179 | 1/1973 | Tweit | 260—309 |

NATALIE TROUSOF, Primary Examiner

U.S. Cl. X.R.

260—465 F, 521 A, 600, 612 D; 424—273

UNITED STATES PATENT OFFICE
CERTIFICATE OF CORRECTION

Patent No. 3,842,097          Dated October 15, 1974

Inventor(s)   Robert C. Tweit

It is certified that error appears in the above-identified patent and that said Letters Patent are hereby corrected as shown below:

Column 1, line 42, "alkylene" should be --alkylenes--.

Column 1, line 50, "halogen" should be -- halogens --.

Column 1, lines 53-55 should be deleted

Column 2, line 26, "hydiogen" should be -- hydrogen --.

Column 2, line 56, "5" should be -- 1 --.

Column 4, line 62, "[2-A" should be -- [2-( --.

Column 5, line 61, "[1-(" should be -- [7-( --.

Column 9, line 43, "{[2" should be -- 2-{[2 --.

Column 9, second formula, " 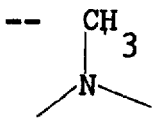 " should be 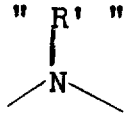 --.

Signed and sealed this 4th day of February 1975.

(SEAL)
Attest:

McCOY M. GIBSON JR.          C. MARSHALL DANN
Attesting Officer            Commissioner of Patents